(12) United States Patent
Wang et al.

(10) Patent No.: US 8,409,736 B2
(45) Date of Patent: Apr. 2, 2013

(54) CAP ASSEMBLY WITH DESIRABLE SAFETY PERFORMANCE

(75) Inventors: Peng Wang, Dongguan (CN); Feng-gang Zhao, Dongguan (CN); Wei Chen, Dongguan (CN)

(73) Assignee: Dongguan Amperex Technology Limited, Dongguan (CN)

( * ) Notice: Subject to any disclaimer, the term of this patent is extended or adjusted under 35 U.S.C. 154(b) by 352 days.

(21) Appl. No.: 12/819,403

(22) Filed: Jun. 21, 2010

(65) Prior Publication Data

US 2010/0330402 A1 Dec. 30, 2010

(30) Foreign Application Priority Data

Jun. 24, 2009 (CN) ...................... 2009 2 0059057 U

(51) Int. Cl.
*H01M 2/12* (2006.01)
(52) U.S. Cl. ......................................................... 429/53
(58) Field of Classification Search ...................... 429/53
See application file for complete search history.

(56) References Cited

U.S. PATENT DOCUMENTS

2009/0320277 A1* 12/2009 Barrella et al. .............. 29/623.1
2010/0143796 A1* 6/2010 Mao et al. ..................... 429/185

FOREIGN PATENT DOCUMENTS

CN 101257099 * 9/2008

* cited by examiner

*Primary Examiner* — Karie O'Neill Apicella
(74) *Attorney, Agent, or Firm* — Hamre, Schumann, Mueller & Larson, P.C.

(57) ABSTRACT

A cap assembly with desirable safety performance for use in lithium ion batteries, includes an insulating gasket defining a through hole therein, a rupture plate positioned in the through hole, a vent plate defining an air hole electrically connected with the rupture plate, a current interrupt device disposed on the rupture plate, and an end cap defining an air exhaust hole assembled on the current interrupt device. The current interrupt device has an upper conductive plate electrically connected with the end cap, a lower conductive plate electrically connected with the rupture plate, and a fuse electrically connecting the upper conductive plate and the lower conductive plate. When the current intensity in the lithium ion battery exceeds a predetermined value, the fuse melts to cut off the current path.

8 Claims, 3 Drawing Sheets

CAP ASSEMBLY WITH DESIRABLE SAFETY PERFORMANCE

CROSS-REFERENCE TO RELATED APPLICATION

The present patent application claims the benefit of Chinese Patent Application No. 200920059057.3, filed Jun. 24, 2009, the disclosure of which is hereby incorporated herein by reference in its entirety.

FIELD OF THE INVENTION

The present patent application generally relates to lithium ion batteries and, more particularly, to a cap assembly with desirable safety performance for use in lithium ion batteries.

BACKGROUND OF THE INVENTION

Recently, lithium ion batteries, especially, cylindrical lithium ion batteries, are widely used in various kinds of portable electronic devices, such as video cameras, laptop personal computers, portable DVDs and personal digital assistants, due to high energy density, high working voltage and long life span.

At present, much more attentions have been paid to the safety performance of lithium ion batteries because of the use of high-energy chemical materials and energy concentration. Conventionally, to improve the safety performance of a lithium ion battery, a positive temperature coefficient (PTC) thermistor is provided in the lithium ion battery. When there is a high current in the lithium ion battery because of internal short circuit or external short circuit, the PTC thermistor can remarkably reduce the occurrence of safety accidents.

However, for the batteries which need to discharge at high discharge rate for use in electric tools, for instance electric vehicle batteries, the PTC thermistor cannot be used any more. Consequently, there is still no effective protecting device to improve the safety performance of the lithium ion batteries which need to discharge at high discharge rate. Safety accident possibly occurs in the discharge process of these kinds of lithium ion batteries.

What is needed, therefore, is to provide a cap assembly with desirable safety performance for use in lithium ion batteries.

SUMMARY OF THE INVENTION

One object of the present invention is to provide a cap assembly which has desirable safety performance for use in lithium ion batteries.

In accordance with one embodiment of the present invention, a cap assembly for use in lithium ion batteries includes: an insulating gasket defining a through hole therein, a rupture plate positioned in the through hole, a vent plate defining an air hole electrically connected to the rupture plate, a current interrupt device disposed on the rupture plate, and an end cap defining an air exhaust hole assembled on the current interrupt device. The current interrupt device includes an upper conductive plate electrically connected to the end cap, a lower conductive plate electrically connected with the rupture plate, and at least one fuse electrically connecting the upper conductive plate and the lower conductive plate. When the current intensity in the lithium ion battery exceeds a predetermined value, the fuse melts to cut off the current path.

According to the embodiment of the present invention, the current interrupt device can melt to cut off the current path when the lithium ion battery discharges at a high discharge rate, so as to improve the safety performance of the lithium ion battery.

Preferably, the current interrupt device includes an insulating plate sandwiched between the upper conductive plate and the lower conductive plate. The insulating plate electrically insulates the rest part of the upper conductive plate from the lower conductive plate except the fuse.

Preferably, the insulating plate defines at least one through-hole. The upper conductive plate and the lower conductive plate each defines at least one punching hole corresponding to the through-hole. The sidewalls around the punching holes are inserted into the through-hole and electrically connected with each other via the fuse.

Preferably, the upper conductive plate and the lower conductive plate are electrically connected with each other by the fuse via soldering.

Preferably, the vent plate and the rupture plate are electrically connected to each other via soldering.

Preferably, the vent plate and the rupture plate are electrically connected to each other via riveting.

Preferably, number of the fuses can be adjusted according to the requirement of charge and discharge of the lithium ion battery, or to the predetermined resistance of the current interrupt device.

Preferably, the cap assembly further includes an insulating grommet enclosing the vent plate, the insulating grommet is spaced from the inner sidewall of the insulating gasket.

Preferably, the insulating grommet is formed with an mounting slot for safely receiving the vent plate.

Preferably, the insulating gasket is formed with an annular flange at a bottom end thereof for holding the vent plate broken from the rupture plate.

Other advantages and novel features will be drawn from the following detailed description of preferred embodiments with the attached drawings. The accompanying drawings, which are incorporated in and constitute a part of this specification, illustrate embodiments of the present invention and, together with a general description of the invention given above, and the detailed description of the embodiments given below, serve to explain the principles of the invention:

DETAILED DESCRIPTION OF THE INVENTION

Figure 1:
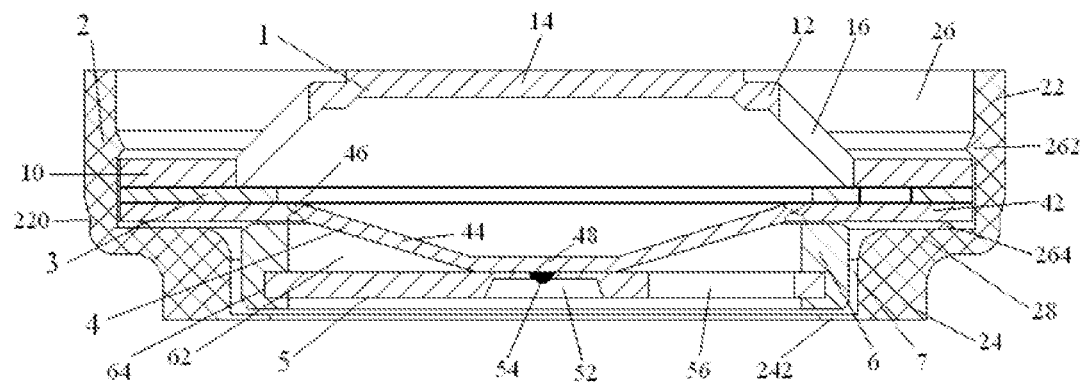
FIG. 1 depicts a cross-sectional view of a cap assembly for use in lithium ion batteries according to one embodiment of the present invention.

Referring to FIG. 1, the cap assembly for use in lithium ion batteries according to one embodiment of the present invention includes an end cap 1, an insulating gasket 2, a current interrupt device (hereinafter referred as CID) 3, a rupture plate 4, a vent plate 5 and an insulating grommet 6.

The end cap 1 is formed in a cap shape and includes an annular base portion 10, an oblique portion 12 extending upwardly and obliquely from inner edge of the base portion 10, and a planar top portion 14 seated at top end of the oblique portion 12. The oblique portion 12 defines a number of air exhaust holes 16.

The insulating gasket 2 is a hollow cylinder defining a stepped through hole 26 therein. The insulating gasket 2 forms a clamping end 22 with a larger diameter at an upper end thereof and a retaining end 24 with a smaller diameter at a lower end thereof. The outer surface of the sidewall of the insulating gasket 2 adjacent the retaining end 24 depresses inwardly to form a depressed portion 220. The diameter of the through hole 26 at the clamping end 22 is corresponding to the outer diameter of the end cap 1. Sidewall around the through hole 26 adjacent the clamping end 22 is provided with an annular protrusion 262 extending inwardly. A horizontal step 28 interconnecting the clamping end 22 and the retaining end 24 is formed with an annular sealing projection 264 extending upwardly. The retaining end 24 is formed with an annular flange 242 extending inwardly at the bottom end thereof.

Figure 2:
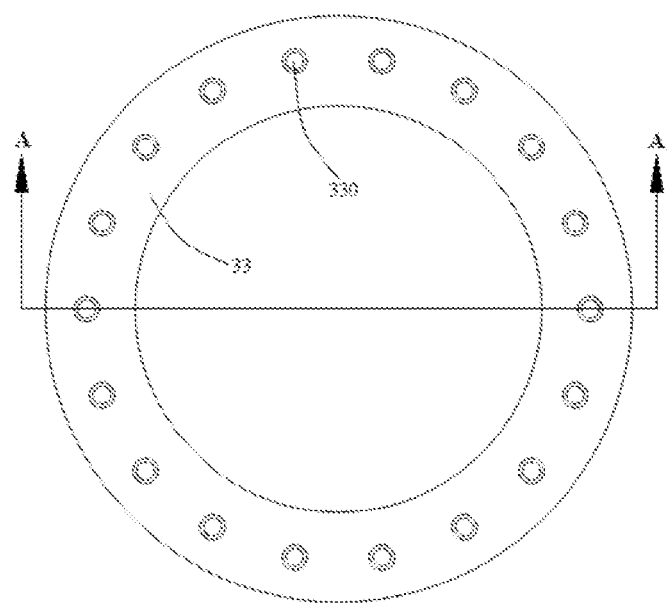
FIG. 2 depicts a top view of a current interrupt device of the cap assembly as shown in FIG. 1.
Figure 3:
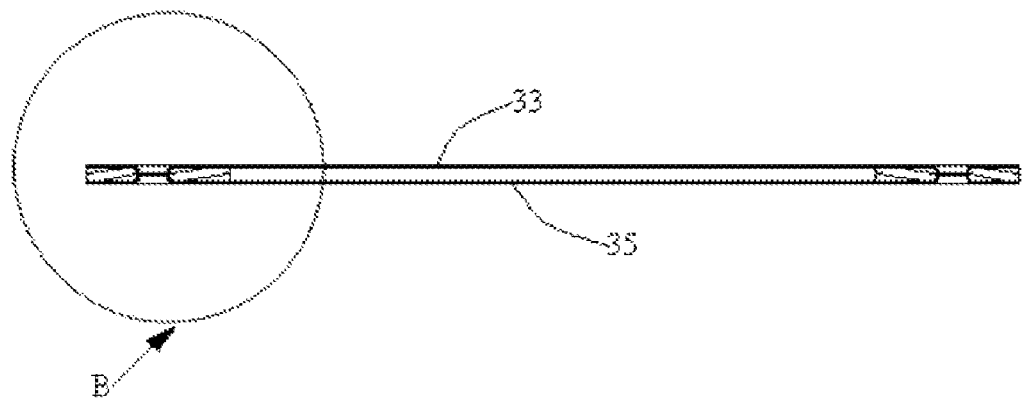
FIG. 3 depicts a cross-sectional view of the current interrupt device along a line A-A as shown in FIG. 2.
Figure 4:
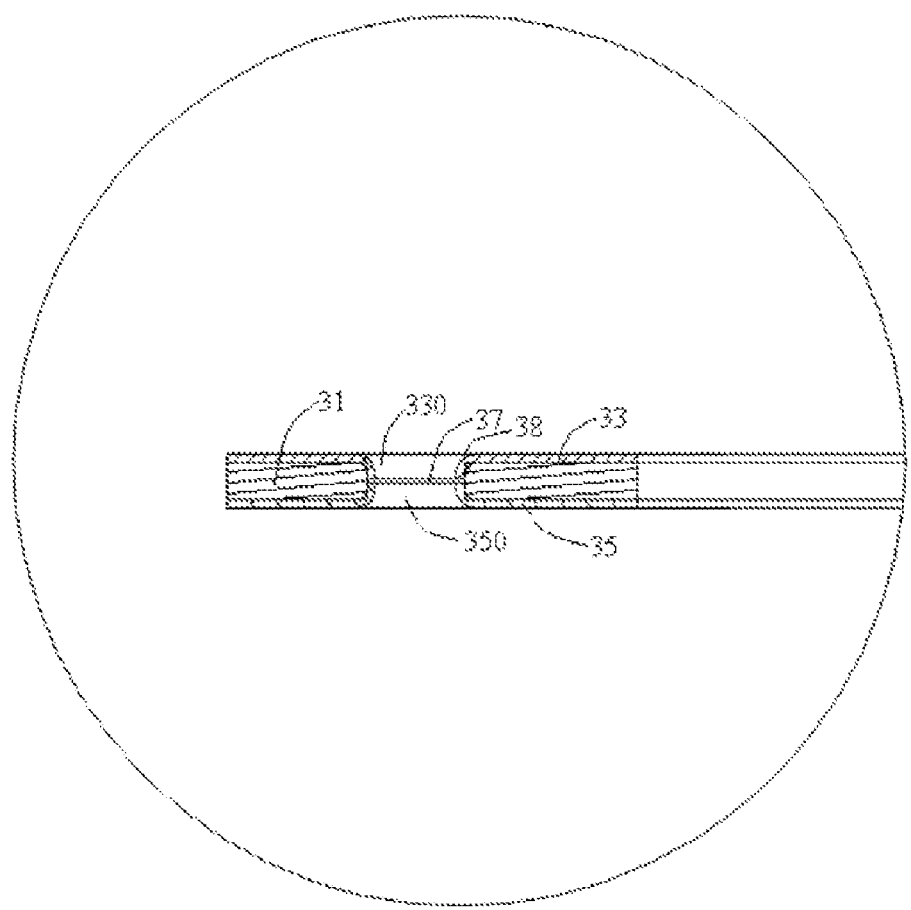
FIG. 4 depicts an enlarged view of a circled portion B as shown in FIG. 3.

Referring to FIG. 2 to FIG. 4, the CID 3 includes an annular insulating plate 31, an upper conductive plate 33 abutting against the upper surface of the insulating plate 31, and a lower conductive plate 35 seated on the lower surface of the insulating plate 31. The upper conductive plate 33 and the lower conductive plate 35 have a shape similar to that of the insulating plate 31. The insulating plate 31 defines at least one through-hole 38 therein. The upper conductive plate 33 and the lower conductive plate 35 each defines at least one punching hole 330, 350 corresponding to the through-hole 38. Sidewall around the pouching hole 330 is inserted into the through-hole 38 downwardly. Sidewall around the pouching hole 350 is inserted into the through-hole 38 upwardly. Two sidewalls around the punching holes 330, 350 are electrically connected to each other by a fuse 37 via soldering, especially high frequency soldering. When the current intensity between the upper conductive plate 33 and the lower conductive plate 35 exceeds a predetermined value, the fuse 37 will melt and cut off the circuit path to ensure the safety performance of the lithium ion battery.

Further referring to FIG. 1, the rupture plate 4 has a shape similar to that of the end cap 1. The rupture plate 4 includes an outer annular portion 42, a connecting portion 44 extending obliquely and downwardly from the inner edge of the annular portion 42, and a circular recessed portion 48 at a lower end of the connecting portion 44. A groove 46 is defined at the boundary of the connecting portion 44 and the annular portion 42. The rupture plate 4 can be ruptured along the groove 46 when the air pressure in the lithium ion battery exceeds a predetermined value.

The vent plate 5 is formed in a disk shape. Central part of the lower surface of the vent plate 5 defines an upwardly recessed channel 52, where a soldering point 54 can be disposed for electrically connecting the vent plate 5 with the rapture plate 4. In the embodiment as illustrated, the vent plate 5 is provided with at least one air hole 56.

The insulating grommet 6 is a hollow cylinder having an outer diameter smaller than the diameter of the through hole 26 at the retaining end 24 of the insulating gasket 2. The insulating grommet 6 defines a through opening 62 at a center thereof. Inner sidewall of the insulating grommet 6 enclosing the through opening 62 defines an annular mounting slot 64 for receiving the vent plate 5.

Figure 5:
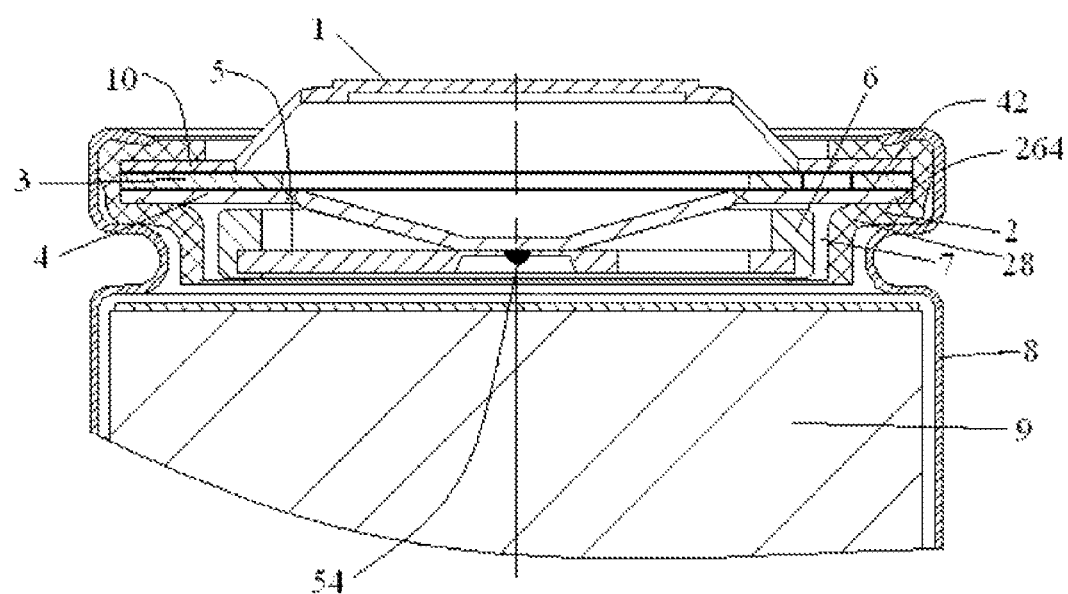
FIG. 5 depicts a cross-sectional view of a lithium ion battery having the cap assembly as shown in FIG. 1.

Referring to FIG. 5, in assembly, the vent plate 5 is set in the mounting slot 64 defined in the insulating grommet 6. The insulating grommet 6 having the vent plate 5 received therein is electrically connected to the rupture plate 4 via the soldering point 54 between the recessed portion 48 of the rupture plate 4 and the vent plate 5. The insulating grommet 6 coupled with the vent plate 5 is set in the chamber enclosed by the rupture plate 4 and the insulating gasket 2, with rest area except the soldering point 54 being electrically insulated from each other. The CID 3 and the end cap 1 are securely seated on the rupture plate 4 supported by the horizontal step 28 of the insulating gasket 2. The current in the cap assembly sequentially flows from the vent plate 5 to the external circuit through the soldering point 54, the rupture plate 4, the lower conductive plate 35, the fuse 37, the upper conductive plate 33 and the end cap 1. In the embodiment as shown, the recessed portion 48 and the vent plate 5 are electrically connected to each other via the soldering point 54. However, according to another embodiment of the present invention, the recessed portion 48 can also be electrically coupled to the vent plate 5 via riveting.

Referring further to FIG. 5, in the clamping process, the clamping end 22 of the insulating gasket 2 deforms downwardly to the end cap 1 and resist securely against the annular base portion 10 of the end cap 1 under the actuation of the can housing 8. In this case, the rupture plate 4 is tightly sandwiched between the horizontal step 28 of the insulating gasket 2 and the end cap 1. The annular sealing projection 264 resists tightly on the bottom surface of the outer annular portion 42, to seal the inner side of the lithium ion battery from the surroundings.

In the clamping process, the deformation of the insulating gasket 2 possibly actuates the rupture plate 4 to move in the through hole 26. If the insulating grommet 6 is fixed, the movement of the rupture plate 4 may breaks the soldering point 54 connecting the vent plate 5 and the rupture plate 4. However, in the illustrated embodiment of the present invention, the insulating grommet 6 is spaced apart from the inner sidewall of the insulating gasket 2. In other words, a chamber 7 is defined between the insulating gasket 2 and the insulating grommet 6, so that the insulating grommet 6 and the vent plate 5 can move together with the rupture plate 4. Consequently, disconnection of the vent plate 5 from the rupture plate 4 due to the break of the soldering point 54 is avoided.

When the lithium ion battery having the cap assembly according to the present invention functions appropriately, the CID 3 generates little heat. However, once the lithium ion battery generate high current in charge or discharge process due to internal short circuit or external short circuit, the fuse 37 of the CID 3 in the cap assembly will melt to cut off the current path promptly, which can prevent the lithium ion battery from burning or exploding. The number of the fuse 37 can be adjusted according to the requirement of charge and discharge of the lithium ion battery or the predetermined resistance of the CID 3. In the embodiment as shown in FIG. 2, the CID 3 is provided with a number of fuses 37 apart from each other along the circumference thereof.

If the air in the lithium ion battery expands due to high temperature therein, the expanded air will enter the space between the vent plate 5 and the rupture plate 4 via the air hole 56 defined in the vent plate 5. When the air pressure exceeds the bonding strength of the soldering point 54, the rupture plate 4 will disconnect from the vent plate 5 at the soldering point 54 under the actuation of the air pressure, so as to cut off the current path of the lithium ion battery and prevent the temperature of the air in the lithium ion battery from further increasing. If the air pressure further increases, the rupture plate 4 will rupture along the groove 46 so that the air can vent into the surrounding through the air exhaust hole 16 defined in the end cap 1 and, therefore, prevents the lithium ion battery from burning or exploding. In this case, although the vent plate 5 is disconnected from the rupture plate 4, the vent plate 5 will not fall into the battery cell 9 and further contacts the can housing 8 or the positive material and negative material of the battery cell 9 due to the arrangement of the annular flange 242 of the insulating gasket 2.

It should be noticed that, the cap assembly according to the embodiment of the present invention can be used in power lithium ion batteries, especially lithium ion batteries in battery stack in series or in parallel, for example, the batteries in the electric tools or the electric vehicles.

While the present invention has been illustrated by the above description of the preferred embodiments thereof, while the preferred embodiments have been described in considerable detail, it is not intended to restrict or in any way limit the scope of the appended claims to such details. Additional advantages and modifications within the spirit and scope of the present invention will readily appear to those ordinary skilled in the art. Consequently, the present invention is not limited to the specific details and the illustrative examples as shown and described.

What is claimed is:

1. A cap assembly for a lithium ion battery, comprising:
   an insulating gasket defining a through hole therein;
   a rupture plate positioned in the through hole;
   a vent plate defining an air hole electrically connected to the rupture plate;
   a current interrupt device disposed on the rupture plate; and
   an end cap including an air exhaust hole disposed on the current interrupt device;
   wherein the current interrupt device includes an insulating plate, an upper conductive plate disposed against an upper surface of the insulating plate and electrically connected to the end cap, and a lower conductive plate disposed against a lower surface of the insulating plate and electrically connected to the rupture plate;
   the insulating plate includes a plurality of through holes, the upper conductive plate and the lower conductive plate each includes a plurality of punching holes corresponding to the through holes;
   a sidewall around each punching hole of the upper conductive plate inserted into the through hole and a sidewall around each punching hole of the lower conductive plate inserted into the through hole are configured to be electrically connected to each other via a fuse in the through hole;
   the fuse is configured to melt when a current intensity between the upper conductive plate and the lower conductive plate exceeds a predetermined value.

2. The cap assembly of claim 1, wherein the upper conductive plate and the lower conductive plate are electrically connected with each other by the fuse via soldering.

3. The cap assembly of claim 1, wherein the vent plate and the rupture plate are electrically connected to each other via soldering.

4. The cap assembly of claim 1, wherein the vent plate and the rupture plate are electrically connected to each other via riveting.

5. The cap assembly of claim 1, wherein number of the fuse can be adjusted according to the requirement of charge and discharge of the lithium ion battery or the predetermined resistance of the current interrupt device.

6. The cap assembly of claim 1, further comprising an insulating grommet enclosing the vent plate, and an insulating grommet is spaced from the inner sidewall of the insulating gasket.

7. The cap assembly of claim 6, wherein the insulating grommet defines a mounting slot for safely receiving the vent plate.

8. The cap assembly of claim 1, wherein the insulating gasket is formed with an annular flange at a bottom end thereof for holding the vent plate broken form the rupture plate.

* * * * *